US011223583B2

(12) United States Patent
D'Agostino et al.

(10) Patent No.: US 11,223,583 B2
(45) Date of Patent: Jan. 11, 2022

(54) CHAT BOT CONVERSATION MANAGER

(71) Applicant: The Toronto-Dominion Bank, Toronto (CA)

(72) Inventors: Dino Paul D'Agostino, Richmond Hill (CA); Amanda Le Amaral, Cambridge (CA); Andrew David Clark, Whitby (CA); Michel Henault-Ethier, Montreal (CA); Randall Walton Martin, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 50 days.

(21) Appl. No.: 16/923,784

(22) Filed: Jul. 8, 2020

(65) Prior Publication Data
US 2020/0344187 A1  Oct. 29, 2020

Related U.S. Application Data

(63) Continuation of application No. 16/136,450, filed on Sep. 20, 2018, now Pat. No. 10,749,822.

(51) Int. Cl.
*H04L 12/58* (2006.01)
*G06F 3/0481* (2013.01)
*H04L 29/06* (2006.01)

(52) U.S. Cl.
CPC ............ *H04L 51/02* (2013.01); *G06F 3/0481* (2013.01); *H04L 63/08* (2013.01)

(58) Field of Classification Search
CPC ........ H03L 51/02; H03L 51/04; G06F 3/0481
See application file for complete search history.

(56) References Cited

U.S. PATENT DOCUMENTS

| 8,676,913 B1 * | 3/2014 | Roche .................... G06Q 50/01 709/206 |
| 9,794,199 B2 * | 10/2017 | Capper .................. H04L 51/02 |
| 10,749,822 B2 | 8/2020 | D'Agostino et al. |

(Continued)

FOREIGN PATENT DOCUMENTS

WO  WO2017189559  11/2017

OTHER PUBLICATIONS

CA Office Action issued in Canadian Appln. No. 3,018,060, dated Sep. 20, 2021, 3 pages.

*Primary Examiner* — Ponnoreay Pich
(74) *Attorney, Agent, or Firm* — Fish & Richardson P.C.

(57) ABSTRACT

The present disclosure involves systems, software, and computer implemented methods for tracking of a conversation and management of multi-channel, multi-interaction customer conversations across multiple chat bots. One example system includes operations to receive a first signal comprising a first set of conversational input received via interactions with a conversational interface from a client device, the conversational interface associated with a plurality of chat bots and manages interactions between the client device and the plurality of chat bots. The received conversational input is analyzed to determine a context of the received conversational input based on characteristics of the received conversational input. A request is transmitted to an identified first chat bot associated with the determined context and a response is received from the identified first chat bot. The response is transmitted to the client device for presentation.

20 Claims, 5 Drawing Sheets

(56) References Cited

U.S. PATENT DOCUMENTS

| | | | | |
|---|---|---|---|---|
| 2001/0048449 | A1* | 12/2001 | Baker | H04L 67/306 |
| | | | | 715/758 |
| 2002/0198009 | A1* | 12/2002 | Komsi | H04L 51/18 |
| | | | | 455/466 |
| 2003/0131055 | A1* | 7/2003 | Yashchin | H04L 12/1822 |
| | | | | 709/204 |
| 2008/0307038 | A1* | 12/2008 | Nichols | G06Q 10/107 |
| | | | | 709/203 |
| 2016/0100130 | A1 | 4/2016 | Holzman et al. | |
| 2016/0300570 | A1* | 10/2016 | Gustafson | G10L 13/00 |
| 2016/0308799 | A1* | 10/2016 | Schubert | H04L 51/02 |
| 2016/0352656 | A1* | 12/2016 | Galley | G06N 3/0454 |
| 2016/0360039 | A1* | 12/2016 | Sanghavi | H04M 3/5166 |
| 2017/0180284 | A1 | 6/2017 | Smullen et al. | |
| 2017/0230312 | A1* | 8/2017 | Barrett | H04L 51/02 |
| 2017/0324866 | A1 | 11/2017 | Segre et al. | |
| 2017/0324867 | A1 | 11/2017 | Tamblyn et al. | |
| 2017/0358296 | A1 | 12/2017 | Segalis et al. | |
| 2018/0025726 | A1 | 1/2018 | Bayser et al. | |
| 2018/0090137 | A1 | 3/2018 | Horling et al. | |
| 2018/0253985 | A1* | 9/2018 | Aggarwal | G09B 7/00 |
| 2019/0215282 | A1* | 7/2019 | Briggs | G06N 3/006 |
| 2019/0370629 | A1* | 12/2019 | Liu | G06F 40/30 |
| 2020/0099633 | A1* | 3/2020 | D'Agostino | G06F 3/0481 |

* cited by examiner

402

```
TD Online Chat                                                              TD
```

> Hey, how are my TFSA stocks doing today? 404

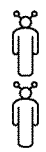

Hi Melissa! Welcome back ☺ I am happy to get that info for you. 406

Here's a snapshot of your investment portfolio as of 10:32am. 408

| HOLDINGS | ACTIVITY | PREFERENCES | GAIN & LOSS |
|---|---|---|---|
| Stock Value of Investments $13,857.15 | Market Value of Investments $15,434.54 | | Gain / Loss of Investments +$1,577.39 |

SUMMARY | CLOSED

| Name | Quantity | Avg. Cost | Price | Book Value | Mkt Value | Gain/Loss |
|---|---|---|---|---|---|---|
| T08900 TDCSQ14DC.MUFAC | 223.035 | $22.05 | $22.01[1] | $5,201.56 | $5,182.27 | -$9.29 -0.18% |
| T08908 TDCSQ1IUHH.MUFAD | 113.493 | $33.97 | $46.56[1] | $3,856.31 | $5,316.14 | +$1,560.83 +89.80% |
| T00211 TDCS454UH.MUFAZ | 437.055 | $10.45 | $11.50[1] | $4,820.28 | $5,026.13 | +$525.85 +4.70% |

> Pls transfer $2,500 from my Checkings to that account 410

I can certainly do that for you. I see you have two chequing accounts, which one would you like me to transfer from? 412

| Ultimate Checking Account: $13,420.33 | Minimum Checking Account: $6,552.41 |

> Ultimate 414

Great. I've transferred $2,500 from your Ultimate Checking Account to your CAD TFSA. 416

> Buy 10 shares of ABC Stock 418

To confirm, you would like to buy 10 shares of ABC Stock for $41.53 CAD each, for a total of $415.30 CAD. You will be charged an additional $9.99 for this buy transaction. Would you like to proceed. 420

| YES | NO |

> Yes 422

CHAT BOT CONVERSATION MANAGER

CROSS-REFERENCE TO RELATED PATENT APPLICATIONS

This application is a continuation of and claims the benefit of priority to U.S. patent application Ser. No. 16/136,450, filed Sep. 20, 2018, the contents of which are incorporated by reference herein.

TECHNICAL FIELD

The present disclosure relates to computer-implemented methods, software, and systems for a chat bot management system that facilitates conversations between a device and various chat bots.

BACKGROUND

Digital personal assistants such as Apple's Siri, Google's Assistant, Amazon's Alexa, Microsoft's Cortana, and others provide solutions for performing tasks or services associated with an individual's device. Such digital personal assistants can be used to request and perform various data exchanges, including transactions, social media interactions, search engine queries, and others. Additionally, similar functionality can be incorporated into web browsers and dedicated applications. Digital assistants may be one type of conversational interface, where users can input a request or statement into the conversational interface and receive semantic output response to the original input. Conversational interfaces may be included in social networks, mobile applications, instant messaging platforms, websites, and other locations or applications. Conversational interfaces may be referred to as or may be represented as chat bots, instant messaging (IM) bots, interactive agents, or any other suitable name or representation.

Conversational interfaces are commonly integrated into dialog systems of these digital assistants or into specific applications or platforms, and can be used to engage in interactions from casual conversations to expert system analysis. Conversational interfaces may accept inputs and/or output response in various formats, including textual inputs and/or outputs, auditory inputs and/or outputs, video-captured inputs (e.g., via facial movement input) or video or other animated output.

SUMMARY

The present disclosure involves systems, software, and computer implemented methods for managing a conversation with a plurality of chat bots. One example system includes a communications module, at least one memory storing instructions and a plurality of chat bots, and a repository of contextual content, the contextual content for use in formulating at least one response generated in response to a conversational contextual input, and at least one hardware processor interoperably coupled with the at least one memory and the communications module. The instructions stored in the at least one memory can instruct the at least one hardware processor to perform various operations. For example, the instructions can cause the at least one processor to receive, via the communications module, a first signal comprising a first set of conversational input received via interactions with a conversational interface from a client device, the client device associated with an authenticated user. The conversational interface is associated with the plurality of chat bots and manages interactions between the client device and the plurality of chat bots. The received conversational input can be analyzed by a natural language processing engine to determine a context of the received conversational input based on characteristics of the received conversational input.

Next, a first chat bot can be identified from the plurality of chat bots associated with the determined context of the received conversational input. Then, a request is transmitted to the identified first chat bot associated with the determined context in a second signal, the request comprising data from the received conversational input and a first authenticated credential of the authenticated user. A response is then received in a third signal from the identified first chat bot comprising a response to the received conversational input from the client device. The response is transmitted, in a fourth signal, from the identified first chat bot to the client device for presentation.

A fifth signal is received, via the communications module, the fifth signal comprising a second set of conversational input received via interactions with the conversational interface from the client device. The received second set of conversational input from the second signal is analyzed to determine a second context of the received conversational input based on characteristics of the received conversational input. In response to determining that the determined second context is different from the determined first context, a second request is transmitted using a sixth signal to a second chat bot from the plurality of chat bots, the second chat bot associated with the determined second context and the request comprising data from the received second set of conversational input and a second authentication credential of the client device without re-authenticating the client device for communicating with the second chat bot.

Implementations can optionally include one or more of the following features.

In some instances, the instructions further instruct the at least one hardware processor to determine that a fraud alert exists corresponding to an account that corresponding to the client device, and subsequently route communication from a chat bot corresponding to the fraud alert to the client device before analyzing the received conversational input from the first signal to determine the context of the received conversational input from the first signal.

In some instances, the instructions further instruct the at least one hardware processor to, in response to determining an authentication of a user corresponding to the client device, comparing credentials of the user to one or more stored credentials and generate the authentication credential for the user corresponding to the client device in response to determining the credentials of the user matches one or more stored credentials.

In some instances, determining the context of the received conversational input from the second signal is different from the context of the received conversational input from the first signal can include generating a historical context for the client device to track an ongoing conversation that comprises the first signal, the second signal, and one or more subsequent signals from the client device stored in memory, storing the context of the received conversational input from the first signal in the memory, and storing the context of the received conversational input from the second signal in the memory.

In some instances, generating the historical context for the client device to track an ongoing conversation that comprises the first signal, the second signal, and one or more subsequent signals from the client device in stored memory further includes receiving a second response from the second chat bot comprising a second response to the second set of conversational input from the client device, transmitting the second response from the second chat bot to the client device for presentation, in response to determining a conversation with the second chat bot has ended, transmitting a third request to the identified first bot indicating a return to the received conversational input with the client device, and transmitting a response to the third request to the client device indicating the return to the received conversational input.

In some instances, transmitting the response from the identified first chat bot to the client device further includes generating a graphical representation of the response from the identified first chat bot and transmitting the graphical representation of the response from the identified first chat bot to the client device.

In some instances, analyzing the received conversational input from the first signal to determine a context of the received conversational input from the first signal includes generating a count for a number of times the client device transmits a conversational input for the analyzed context over a period of time, comparing the count to a predetermined threshold, and, in response to determining the count exceeds the predetermined threshold, generating a response to provide to the client device for a subsequent request that links the client device with a particular chat bot that corresponds to the analyzed context.

In some instances, the received conversational input comprises a received query.

In some instances, the received conversational input comprises audio input received via the conversational interface.

In some instances, transmitting the request to the identified first chat bot further includes generating the request using a first protocol that the identified first chat bot recognizes.

In some instances, the first authentication credential is utilized for communicating with the first chat bot and the second authentication credential is utilized for communicating with the second chat bot.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4 is an example screenshot from one implementation of an example of an interface for a chat bot management system as displayed on a client device for providing interactions with two or more chat bots.

DETAILED DESCRIPTION

Figure 1:
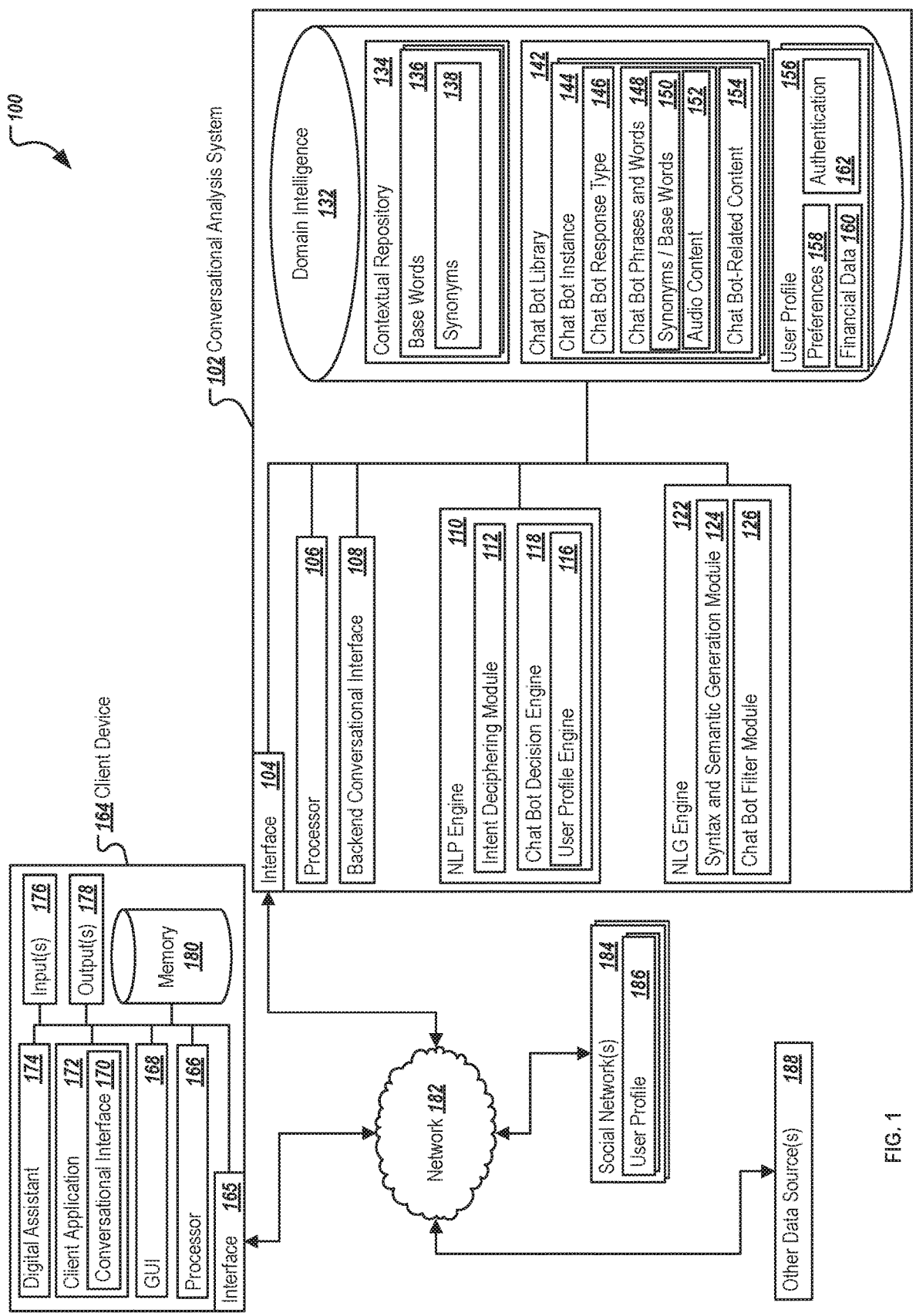
FIG. 1 is a block diagram illustrating an example system for a chat bot management system that facilitates conversations between a device and various chat bots.

The present disclosure describes various tools and techniques associated with a conversation management chat bot system that support the tracking and management of a conversation between a user and various chat bots. The conversation management chat bot system supports the management of multi-channels for multi-interaction customer conversations across various subject matters corresponding to various chat bots. A user can provide a request, through a conversational interface on a client device, to the conversation management system, where the conversation management system can interpret the context of the request associated with the input, determine which chat bot from a plurality of chat bots is able to assist with providing a suitable response, and provide the request to the determined chat bot. Further, the conversation management chat bot system can manage security between conversations and provide authentication and account identification across chat bot borders.

When managing a conversation for users and various chat bots, a seamless flow of conversation is an important aspect of the design. Generally, during a conversation, two individuals can converse on a first topic and switch between the first topic and a second topic without initiating a request to change from the first topic to the second topic. This would cause an interrupted flow in normal conversation that may be socially awkward. The conversation management chat bot system operates in a similar manner. The conversation management chat bot system can determine from a context of the request from a first user an intention of the request. Based on the intention of the request, the conversation management chat bot system can route the request to a first chat bot that understands or has subject matter expertise in area of the intention of the request. The first chat bot, in tandem with the conversation management chat bot system, can formulate a response to the user's request based on the intention of the request. Additionally, the user can provide a subsequent request that references the first request indirectly or that discusses a new topic entirely. The conversation management chat bot system can gracefully follow the flow of the user's conversation (i.e., from the first request to one or more subsequent requests) and shift the responses as well by (1) recognizing the intent of each request from the user and (2) directing each user's request to a particular corresponding chat bot that understands the subject matter of the request. Each chat bot in the plurality of chat bots can have a different subject matter expertise. This is a major benefit from typical systems, as the user does not have to re-authenticate each time he or she changes the topic because in typical systems, each time a user communicates with a new chat bot, a new authentication is required. Rather, the system described herein generates a new authentication, or provides an authentication token or other authentication verification, behind the scenes for the user when communicating with a new chat bot. This speeds up the user's conversation and does not interrupt the flow of normal conversation, thus providing a seamless user experience for conversation with chat bots ranging over various discussion topics. Further, the solution provides, from a financial institution's point of view, an efficient resource allocation, as users are connected to and can interact with the correct chat bot or bots in a single location.

Turning to the illustrated example implementation, FIG. 1 is a block diagram illustrating an example system 100 for a chat bot management system that facilitates conversations between a user and various chat bots. System 100 includes functionality and structure associated with receiving inputs from a client device 164 (associated with a user), analyzing the received input at the conversational analysis system 102 to identify a context of the input and based on the context of the input, determine a chat bot from the plurality of chat bots to route the received input. The determined chat bot can then provide a response on the request to the client device 164 in response to providing the input to the conversational analysis system 102. The illustrated system 100 includes or is communicable coupled with a conversational analysis system 102, client device 164, one or more social networks 184, one or more external data sources 188, and a network 182. System 100 is a single example of a possible implementations, with alternatives, additions, and modifications possible for performing some or all of the described operations and functionality. Although shown separately, in some implementations, functionality of two or more systems, servers, or illustrated components may be provided by a single system or server. In some implementations, the functionality of one two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein. In some implementations, particular operations and functionality described herein may be executed at either the client device 164, the conversational analysis system 102, or at one or more other non-illustrated components, as well as at a combination thereof.

As used in the present disclosure, the term "computer" is intended to encompass any suitable processing device. For example, client device 164 and the conversational analysis system 102 may be any computer or processing device (or combination of devices) such as, for example, a blade server, a general-purpose personal computer (PC), MAC, workstation, UNIX-based workstation, embedded system or any other suitable device. Moreover, although FIG. 1 illustrated particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 164 may be any system which can request data, execute an application (e.g., client application 172), and/or interact with the conversational analysis system 102 and the conversational interface 170. The client device 164, in some instances, may be any other suitable device, including a mobile device, such as a smartphone, a tablet computing device, a smartwatch, a laptop/notebook computer, a connected device, or any other suitable device. Additionally, the client device 164 may be a desktop or workstation, sever, or any other suitable device. Similarly, the conversational analysis system 102 may be a server, a set of servers, a cloud-based application or system, or any other suitable system. In some instances, the client device 164 may execute on or be associated with a system executing the conversational analysis system 102. In general, each illustrated component may be adapted to execute any suitable operating system, including Linux, UNIX, Windows, Mac OS®, Java™, Android™, Windows Phone OS, or iOS™, among others.

The conversational analysis system 102 can perform functionality associated with one or more backend conversational interfaces 108, can perform operations associated with receiving input from a client device 164 (e.g., via conversational interface 170) associated with the backend conversational interface 108, and can analyze the received input to determine a context or an intent of the input (e.g., a particular question, a query, a comment, or other communication to which a response may be generated for the conversational interface 170). Using the determined context or the determined intent of the input, the conversational analysis system 102 can determine a particular chat bot from a plurality of chat bots to route the received input to for requesting a response. Once the conversational analysis system 102 receives a response from the particular chat bot, the conversational analysis system 102 provides the response to the client device 164 over the network 182 for display on the conversational interface 170.

As illustrated, the conversational analysis system 102 includes an interface 104, a processor 106, a backend conversational interface 108, a natural language processing (NLP) engine 110, a natural language generation (NLG) engine 122, and a domain intelligence 132. Different implementations may include additional or alternative components, with FIG. 1 meant to be an example illustration of one possible implementation. While illustrated separate from one another, at least some of these components, in particular the backend conversational interface 108, the NLP engine 110, the NLG engine 122, may be combined within a single component or system, or may be implemented separate from one another, including at different systems and/or at remote components.

Interface 104 is used by the conversational analysis system 102 for communicating with other systems in a distributed environment—including within the environment 100—connected to the conversational analysis system 102 and/or network 182, e.g., client device 164, social network 184, and/or any other external data sources 188, as well as other systems or components communicably coupled to the network 182. Generally, the interface 104 includes logic encoded in software and/or hardware in a suitable combination and operation to communicate with the network 182 and other communicably coupled components. More specifically, the interface 104 may comprise software supporting one or more communication protocols associated with communications such that the conversational analysis system 102, network 182, and/or interface's hardware is operable to communicate physical signals within and outside of the illustrated environment 100.

Network 182 facilitates wireless or wireline communications between the components of the environment 100 (e.g., between combinations of the conversational analysis system 102, client device(s) 164, and/or other components, among others) as well as with any other local or remote computer, such as additional mobile devices, clients, servers, remotely executed or located portions of a particular component, or other devices communicably coupled to network 182, including those not illustrated in FIG. 1. In this illustrated environment, the network 182 is depicted as a single network, but may be comprised of more than one network without departing from the scope of this disclosure, so long as at least a portion of the network 182 may facilitate communication between senders and recipients. In some instances, one or more of the illustrated components (e.g., the conversational analysis system 102) or portions thereof (e.g., the NLP engine 110, the NLG engine 122, or other portions) may be included within network 182 as one or more cloud-based services or operations. The network 182 may be all or a portion of an enterprise or secured network, while in another instance, as least a portion of the network 182 may represent a connection to the Internet. In some instances, a portion of the network 182 may be a virtual private network (VPN) or an Intranet. Further, all or a portion of the network 182 can comprise either a wireline or wireless link. Example wireless links may include 802.11a/b/g/n/ac, 802.20, WiMax, LTE, and/or any other appropriate wireless link. In other words, the network 182 encompasses any internal or external network, networks, sub-network, or combination thereof operable to facilitate communications between various computing components inside and outside the illustrated environment 100. The network 182 may communicate, for example, Internet Protocol (IP) packets, Frame Relay frames, Asynchronous Transfer Mode (ATM) cells, voice, video, data, and other suitable information between network addresses. The network 182 may also include one or more local area networks (LAMs), radio access networks (RANs), metropolitan area networks (MANs), wide area networks (WANs), all or a portion of the internet and/or any other communication system or systems at one or more locations.

The conversational analysis system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the conversational analysis system 102, in particular, those related to executing the various modules illustrated therein and their related functionality. Specifically, the processor 106 executes the algorithms and operations described in the illustrated figures, as well as the various software modules and functionalities, including the functionality for sending communications to and receiving transmissions from the client device 164 and the social network(s) 184, as well as to process and prepare responses to received input associated with a conversational interface 170. Each processor 106 may have a single core or multiple cores, with each core available to host and execute an individual processing thread.

Regardless of the particular implementations, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

As illustrated, the conversational analysis system 102 includes, is associated with, and/or executes the backend conversational interface 108. The backend conversational interface 108 may be a program, module, component, agent, or any other software component which manages and conducts conversations and interactions via auditory or textual methods, and which may be used to simulate how a human would behave as a conversational partner. In some instances, the backend conversational interface 108 may be executed remotely from the conversational analysis system 102, where the conversational analysis system 102 performs operations associated with identifying and routing received responses to a chat bot from a plurality of chat bots, but where the backend conversational interface 108 assists in determining the intent or content of the response and/or the responses to be provided. The backend conversational interface 108 may be accessed via a website, a web service interaction, a particular application (e.g., client application 172), or it may be a backend portion of a digital or virtual assistant application or functionality of a particular operating system, such as Apple's Siri, Google's Assistant, Amazon's Alexa, Microsoft's Cortana, or others. In some instances, a remote agent or client-side portion of the conversational interface 170 may execute at the client device 164, where inputs can be provided and responses can be presented to the user of the client device 164, while some or all of the processing is performed at the conversational analysis system 102 and the backend conversational interface 108.

The NLP engine 110 represents any suitable natural language processing engine, and performs operations related to understanding a set of received input received at the backend conversational interface 108. Examples of NLP engines that could be used or implemented include a plurality of web services and backend applications, including IBM's Watson, Google Cloud Natural Language API, Amazon Lez, Microsoft Cognitive Services, as well as any proprietary solution, application, or service. The processing performed by the NLP engine 110 can include processing the received input by identifying a context or intent associated with the input received via the backend conversational interface 108, which is performed by the intent deciphering module 112. The result produced by the intent deciphering module 112 can be a set of lexical semantics of the received input, which can then be provided to the Chat Bot Decision Engine 118. In some instances, the result produced by the intent deciphering module 112 can include a string or a short code that describes the intent of the received message.

In some instances, the chat bot decisions engine 118 can determine a particular chat bot from the chat bot library 142, which includes a plurality of chat bots, to route the received input to a particular chat bot for receiving a response. Each chat bot in the chat bot library 142 is stored in or associated with a chat bot instance 144. For example, the chat bot library 142 can have chat bot instance 144-1 through chat bot instance 144-N. Each chat bot may be used by the conversational analysis system 102 for a particular subject, product, or type of request. For example, chat bot instance 144-1 is used for answering requests regarding the user profile, chat bot instance 144-2 is used for answering requests regarding financial information, chat bot instance 144-3 is used for answering requests regarding authentication data of the user, and chat bot instance 144-4 is used or answering requests regarding stock information. Other particular subjects are available for a chat bot instance that include, but are not limited to, social media management, emailing, and mortgage requests. In some instances, different chat bot instances 144 may be associated with different departments of a retailer, while in other instances, different chat bot instances 144 may be associated with different product lines, such as personal banking, investments, account management, and others.

The chat bot decisions engine 118 can include a user profile engine 116 to obtain additional information about a particular user profile associated with the received input. The user profile engine 116 can be used to add user profile information to a request to provide to the identified chat bot. In particular, the user profile engine 116 can retrieve data associated with a particular user profile (determined from the received input) within a plurality of user profiles 156. In some instances, the user profile engine 116 can identify a set of preferences 158 previously defined by the user or determined based on previous interactions and other user operations. Additionally, the user profile 156 for a particular user can also include social network data that may identify particular social network profiles and/or login credentials associated with one or more social networks. The user profile engine 116 can use that information to access a particular social network 184 (e.g., Facebook, Twitter, Reddit, Instagram, etc.) and obtain information about particular social network activities of the user, including particular persons, entities, and other accounts with which the user follows, likes, or otherwise has interacted with as defined by a social network user profile 186, where that information identifies particular public personalities or entities with which later persona-based content and enhancements can be used. In some instances, at least some of the information may be available within the social network data without requiring the user profile engine 116 or another component to access the social networks 184 at the time of the interaction with the backend conversational interface 108. Further, the user profile 156 may store or provide access to financial data 160 associated with the user profile 156, including transaction histories, current account information, stock information associated with the user profile 156, credit and debit cards associated with the user profile 156, checking and savings account information, and other similar data. In some instances, information to access such information may be stored in the financial data 160, and the user profile engine 116 can use that data to access the accounts or other relevant data in real-time during the interactions between the conversational interface 170 and the backend conversational interface 108. In some instance, location information associated with the user may be included in the user profile 156, or may be accessible via the client device 164 or other means. The location information can be used to personalize responses, and to include that information as part of the analysis to the identified chat bot.

The user profile 156 also includes authentication 162, or information and/or credentials used to authenticate the user. The authentication 162 can be used by the conversational analysis system 102 to identify and/or verify the credentials of the user. In particular, when a user provides a request from the client device 164 to the backend conversational interface 108, that request may be associated with or can include one or more credentials of the user. For example, the one or more credentials can include a username, a password, a token for authentication, and other authentication credential data. Upon the conversational analysis system 102 receiving the requested input, the chat bot decision engine 118 can retrieve the one or more credentials from or associated with the requested input to determine which user sent the request. In particular, the chat bot decision engine 118 can compare the one or more credentials to each authentication 162 corresponding to a user profile 156. Once the chat bot decision engine 118 finds a match between the one or more credentials in the received input to a particular authentication 162 in a corresponding user profile 156, the chat bot decision engine 118 can determine who the user is that sent the received input, or can confirm that the identification provided by or associated with the request is authenticated from the client device 164. In some instances, the chat bot decision engine 118 can generate an authentication credential in response to determining the credentials of the user matches the one or more stored credentials. The generated authentication credential can include one or more keys, a token, an identifier of the accepted credential, or another credential to provide to the bot. Additionally, the chat bot decision engine 118 can provide the authentication 162 to each chat bot in corresponding to a chat bot instance 144 depending on the subject matter of the request. By providing the particular authentication 162 to a chat bot instance 144, the user will not have to log in to a chat bot each time the user requests for a different topic of conversation. This will be further explained later.

The NLG engine 122 can receive the output of the identified chat bot instance 144 and prepare a natural language response to the received input based on the output. The NLG engine 122 can be any suitable NLG engine capable of generating natural language responses from the output of the identified chat bot instance 144. In some instances, the NLG engine 122 can identify or otherwise determine at least a base set of words, phrases, or other combinations or tokens to be used in representing the response content received from the identified chat bot instance 144. The base set of words, phrases, or tokens are associated with an initial response determined by the identified chat bot instance 144, and may be an initial representation of the natural language result. The syntax and semantic generation module 124 can perform these operations, and can make decisions on how to place the concept of the response received from identified chat bot 144 into a natural language set of words, phrases, or combination of tokens.

Once the initial set of response content is available for the syntax and semantic generation module 124, a chat bot filter module 126 can be used to apply appropriate modifications to the response content corresponding to the particular identified chat bot instance 144. For the particular chat bot instance 144, the chat bot filter module 126 can retrieve, corresponding to the chat bot instance 144, a chat bot response type 146, chat bot phrases and words 148, synonyms/base words 150, chat bot-related content 154, and corresponding audio content 152. In some instances, the chat bot filter module 126 can apply data from each of these modules corresponding to the chat bot instance 144 to modify the response to provide to the user for the particular chat bot instance 144. For example, the initial set of response content may include a set of characters or numbers unreadable by a user. The chat bot filter module 126 can determine from the context or intent of the initial set of response what the response type should be. For example, if the chat bot filter module 126 determines that the content that the user is requesting for corresponds to a financial response, the chat bot filter module 126 can retrieve from the chat bot response type 146 an indication that the response is associated with money, financial data, and banking data. In another example, if the chat bot filter module 126 determines that the content that the user is requesting for corresponds to social management, the chat bot filter module 126 can retrieve from the chat bot response type 146 an indication that the response is associated with social media. The indication can include a formulation for the response type. For example, the formulation can include a table with one or more rows of data for a financial response type. In another example, the formulation can include multiple entries and a button for the user to enter his or her username and password for a social management response type to access a particular social media website and the button reciting "GO" that will allow the conversational analysis system 102 to login to the corresponding social media platform. In another example, the formulation can include an image of a stock over a period of time and a paragraph beneath the image to describe how well a user's corresponding stock has performed over the period of time for a stock management response. In another example, the formulation can just include a description corresponding to a statement regarding the user's mortgage statements that are paid on a particular frequency basis and how much is paid. Additionally, the description can include how much of the mortgage has been paid and how much of the mortgage is remaining.

The chat bot filter module 126 can also retrieve chat bot phrases and words 148 to formulate the response to the user. The chat bot phrases and words 148 can utilize synonyms and base words 150 corresponding to the particular chat bot instance 144. For example, synonyms and base words 150 corresponding to a chat bot instance 144 regarding social media platform can include words and phrases such as "Facebook," "Twitter," "Instagram," "username," "hashtag," "password," "comment," "like," "post," "tweet," "retweet," "pictures," "search for user," "login," and "logout," to name a few examples. Additionally, synonyms and base words 150 corresponding to a chat bot instance 144 regarding financial data can include words and phrases such as "Checking Account," "Savings Account," "Login," "username," "password," "Money Market Account," "Credit Card," "Debit Card," "Bank," "Financial Institution," and "Interest Rate," to name a few examples. Additionally, synonyms and base words 150 corresponding to a chat bot instance 144 regarding authentication data can include words and phrases such as "Username," "Password," "Token," "Key," "Encryption," "Connection," "Disconnect," "Authentication," and "Credential," to name a few examples. Additionally, the chat bot instance 144 includes a corresponding audio content module 152. The audio content module 152 includes audio data corresponding to the subject matter for the particular chat bot instance 144. The audio data can include voices for that particular chat bot instance 144 corresponding to a famous actor, actress, professional athlete, or famous politician, for providing a response to the user. Additionally, the audio content module 152 includes the ability to convert the one or more words in the synonyms/base 150 to audio with the spoken voice of one or more users. In some instances, the audio content module 152 can include spoken words or phrases of words in various languages. The languages can be set corresponding to the user profile. For example, if the user profile 156 speaks English, Spanish, and Italian, the chat bot filter module 126 can retrieve audio content from a corresponding chat bot instance 144 in English, Spanish, and Italian for the particular user. The chat bot instance 144 also includes chat bot-related content 154 that the chat bot filter module 126 can access. For example, the chat bot-related content 154 can include an identification of the chat bot instance 144 that includes a name of the chat bot, such as "Bob" or "Chat Bot 1" or "Chat Bot Financial", a corresponding address of the chat bot, such as its IP address, MAC address, or any other communication protocoled address. Additionally, the chat bot-related content 154 can include a description of the subject matter of the particular chat bot instance. For example, for chat bot instance 144-1, the subject matter of the particular chat bot instance can include "FINANCIAL," and for chat bot instance 144-2, its subject matter can include "SOCIAL MEDIA."

The chat bot filter module 126 can also retrieve from base words 136 and synonyms 138 to formulate a response to provide to the client device 164 for the user's display. The base words 136 and synonyms 138 can be used to retrieve words such as articles, adjectives, verbs, linking verbs, non-specific nouns, and other words or phrases. The base words 136 and synonyms contain non-specific nouns because the synonyms/base words 150 of the particular chat bot instance 144 contain specific nouns for the specific subject matter of the particular chat bot instance. In particular, the non-specific nouns can include words such as, for example, "computer," "television," "client device," "car," "home," "friend," and "window." Each of the non-specific nouns can be applied to formulate a response for any chat bot instance 144, regardless of the subject matter. In some instances, the syntax and semantic generation module 228 retrieves base words 136 and synonyms 138 to apply to the response before the chat bot filter module 126 applies chat bot specific words to the response.

As illustrated, the conversational analysis system 102 includes domain intelligence 132. In some implementations, the conversational analysis system 102 includes a single memory or multiple memories. The domain intelligence 132 may include any type of memory or database module and may take the form of volatile and/or non-volatile memory including, without limitation, magnetic media, optical media, random access memory (RAM), read-only memory (ROM), removable media, or any other suitable local or remote memory component. The domain intelligence 132 may store various objects or data, include caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the conversational analysis system 102. Additionally, the domain intelligence 132 may store any other appropriate data, such as VPN applications, firmware logs and policies, firewall policies, a security or access log, print or other reporting files, as well as others. As illustrated, domain intelligence 132 includes, for example, contextual repository 134, the chat bot library 142, and the user profile 156, described herein. Domain Intelligence may be local to or remote to the conversational analysis system 102, and may be available remotely via network 182 or an alternative connection in such instances where not locally available. Further, some or all of the data in domain intelligence 132 in FIG. 1 may be located outside of the conversational analysis system 102, including within network 182 as cloud-based storage and data.

Illustrated system 100 includes at least one client device 164, and may include a plurality of client devices 164 in some instances. Each client device 164 may generally be any computing device operable to connect to or communicate within the system 100 via network 182 using a wireline or wireless connection. In general, the client device 164 comprises an electronic computer device operable to receive, transmit, process, and store any appropriate data associated with the system 100 of FIG. 1. As illustrated, the client device 164 can include one or more client applications, including the client application 172 and the digital assistant 174. In some instances, the digital assistant 174 may be a part of the operating system executing on the client device 164, or may be a standalone application or client-side agent of a backend application. In some instances, the client device 164 may comprise a device that includes one or more input(s) 176, such as a keypad, touch screen, camera, or other device(s) that can interact with the client application 172 and/or digital assistant 174 and other functionality, and one or more output(s) 178 that convey information associated with the operation of the applications and their application windows to the user of the client device 164. The output(s) 178 can include a display, speakers, or any other suitable output component. The information presented by the output(s) can include digital data, visual information, auditory output, or a graphical user interface (GUI) 183, as shown with respect to the client device 164. In general, client device 164 includes an electronic computer device operable to receive, transmit, process, and store any appropriate data associated with the environment 100 of FIG. 1.

Client application 172 can be any type of application that allows the client device 164 to request and view content on the client device 164. In some instances, client application 172 may correspond with one or more backend appliances or functionality, including an application or platform associated with the conversational analysis system 102. In some instances, the client application 172 can be associated with a client-side version of the conversational interface 170, where the client-side version of the conversational interface 170 can represent a means for users to provide inputs to the backend conversational interface 108 and receive the output from a particular chat bot instance 144 of the same for viewing at the client device 164.

In many instances, the client device 164 may be a mobile device, including but not limited to, a smartphone, a tablet computing device, a laptop/notebook computer, a smartwatch, or any other suitable device capable of interacting with the conversational analysis system 102 and the backend conversational interface 108. One or more additional client applications 172 may be present on a client device 164, and can provide varying functionality for users. In some instances, client application 172 may be a web browser, mobile application, cloud-based application, or dedicated remote application or software capable of interacting with at least some of the illustrated systems via network 182 to request information from and/or respond to one or more of those systems.

The digital assistant 174 may be any interactive artificial or virtual intelligence component, agent, or other functionality that can be interacted with by a user, either textually or verbally through one or more input(s) 176 (e.g., a microphone), manually through one or more input(s) 176 (e.g., physical or virtual keyboards, touch screen buttons or controls, other physical or virtual buttons, etc.), or through captured gestures or movements identified by the client device 164. In general, the digital assistant 174 may be a software agent, module, or component, among others, that can perform tasks or services for an individual in response to one or more inputs, and can include or represent a particular conversational interface associated with the backend conversational interface 108. As indicated, any one of numerous commercial examples may be used, as well as other proprietary or application-specific assistants. The digital assistant 174 may work and interact via text (e.g., chat), voice, image submission, or other suitable inputs. Some virtual assistants can interpret input using natural language processing (NLP) to match user text or voice input to executable commands. In some instances, the digital assistant 174 can be interacted with to initiate and perform one or more input and response interactions described herein. In some instances, the digital assistant 174 may be a standalone application (e.g., Google Assistant executing on an iPhone), functionality included in a particular application used for other purposes (e.g., an Alexa-enabled Amazon app), or an agent or other functionality built into the operating system (e.g., Siri on Apple's iOS).

As illustrated, the client device 164 may also include an interface 165 for communication (similar to or different from interface 104), a processor 166 (similar to or different from processor 106), memory 180 (similar to or different from domain intelligence 132), and GUI 168. GUI 168 can interface with at least a portion of the environment 100 for any suitable purpose, including generating a visual representation of the client application 172 and/or the digital assistant 174, presenting a pop-up or push notification or preview thereof, presenting the UI associated with the conversational interface 165, or any other suitable presentation of information. GUI 168 may also be used to view and interact with various Web pages, applications, and Web services located local or external to the client device 164, as well as information relevant to the client application 172. Generally, the GUI 168 provides the user with an efficient and user-friendly presentation of data provided by or communicated within the system. The GUI 168 may comprise a plurality of customizable frames or views having interactive fields, pull-down lists, and buttons operated by the user. For example, the GUI 168 may provide interactive elements that allow a user to view or interact with information related to the operations of processes associated with the conversational analysis system 102 and any associated systems, among others. In general, the GUI 168 is often configurable, supports a combination of tables and graphs (bar, line, pie, status dials, etc.), and is able to build real-time portals, application windows, and presentations. Therefore, the GUI 168 contemplates any suitable graphical user interface, such as a combination of a generic web browser, a web-enabled application, intelligent engine, and command line interface (CLI) that processes information in the platform and efficiently presents the results to the user visually.

The external data sources 188 illustrated in FIG. 1 may be any other data source that provides additional information to the conversational analysis system 102. The information may be used by the Chat Bot Decision Engine 118 to determine a particular response to the received input as described herein. Any number of data sources 188 may be used in alternative implementations.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
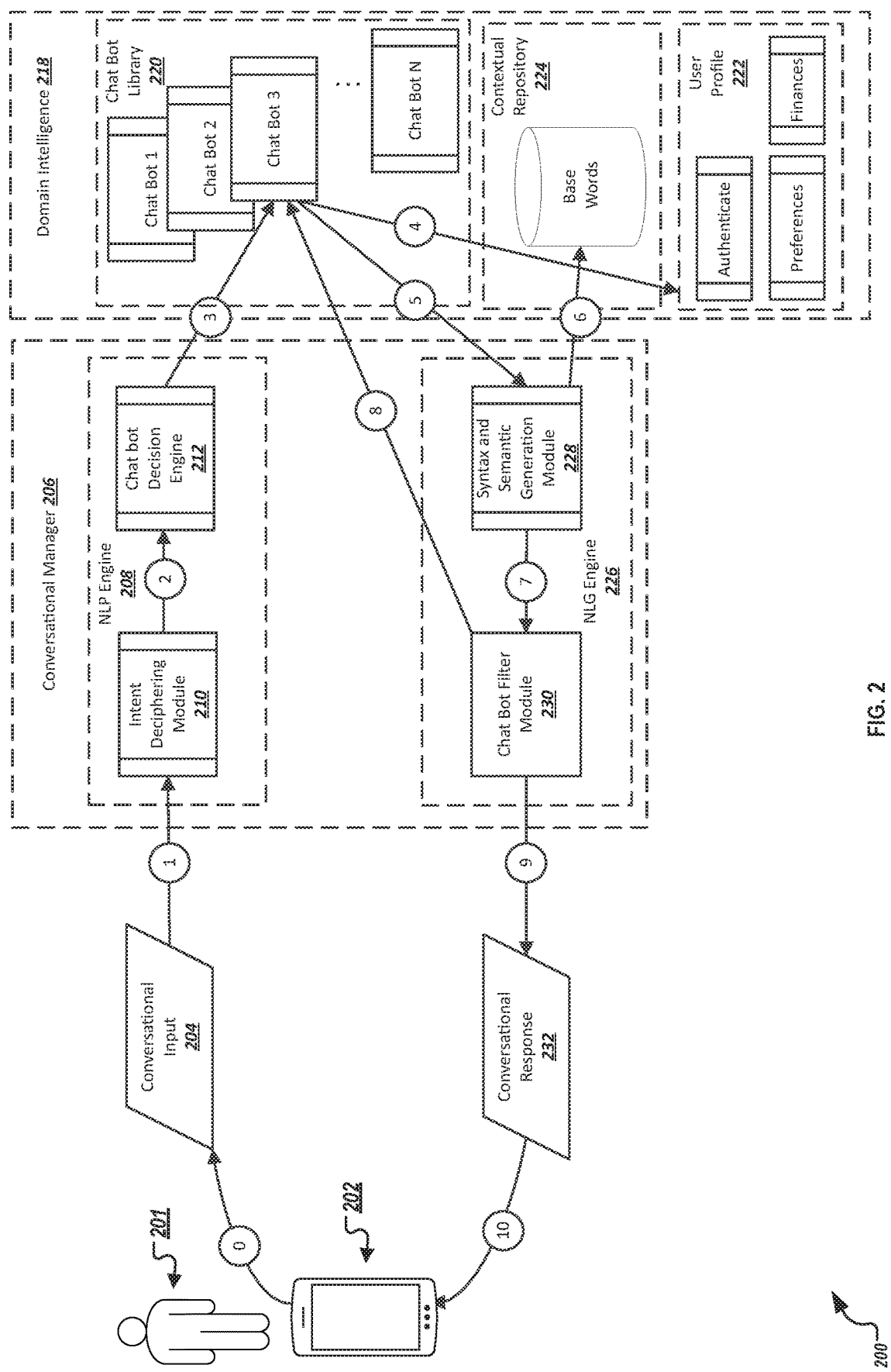
FIG. 2 is a data and control flow of example interactions performed by a chat bot management system that facilitates conversations between a device and various chat bots.

FIG. 2 is a data and control flow of example interactions 200 performed by a chat bot management system that facilitates conversations between a user and various chat bots. The diagram provides an example set of operations and interactions to receive a response, determine an intent of the response, identify a particular chat bot to route the response to be based on the determined intent of the response, and provide a formulated response back to the user from the particular chat bot. A user 201 uses a client device 202 to provide the request. In particular, a user 201 interacts with a conversational interface (or client device at which a user 201 is interacting with the conversational interface), an NLP engine 208 (including an intent deciphering module 210 and a chat bot decision engine 212) a chat bot library 220, a contextual repository 224, a user profile 222, and an NLG engine 226. These components may be similar to or different from the components described in FIG. 1.

As illustrated, the user 201 interacts with a client device 202 to provide a conversational or user input 204 to the conversational manager 206 (0). In particular, the user input 204 is provided or transferred to an NLP engine 208 to determine both an intent of the conversational input 204 (using the intent deciphering module 210) and a determination of the chat bot instance to route the conversational input 204 based on the determined intent of the conversational input 204 (using the chat bot decision engine 212) (1). For example, the conversational input 204 can recite "How much money do I have in my bank account?" In some instances, the determination of the intent and the determination of the chat bot instance for routing the received request may be separate activities or actions. The intent can represent the question, query, or information associated with the conversational input 204, and can be determined using any suitable method. In some instances, a natural language processing (NLP) engine may be used to understand the intent, which is what the conversational input 204 desires, is asking about, or otherwise relates to. The intent of the conversational input 204 is then used to determine a matching chat bot.

In some instances, the intent deciphering module 210 provides an output that describes the intent of the received input (2). In particular, the output can be a message string describing the intent of the received input or a code that corresponds to a particular intent used by each of the chat bots. For example, the message string can be "FINANCE" or "SOCIAL MEDIA," which can then be used by the chat bot decision engine 212. In another example, the intent deciphering module 210 can output a code such as "1101" that corresponds to a particular intent, such as "MORTGAGE." In some instances, the intent deciphering module 210 can determine a type of the conversational input 204 as well, such as a question, a statement, or a request, to name a few examples. The intent deciphering module can provide the output and the received input from the client device 202 to the chat bot decision engine 212.

In some instances, the chat bot decision engine 212 can authenticate the received input transmitted by the client device 202, or a user associated with the input. In particular, the chat bot decision engine 212 can retrieve one or more credentials from or associated with the received input (e.g., username, password, token, and/or key) and compare the one or more credentials to the authentication portion of each user profile 222. Once the chat bot decision engine 212 determines a match exists, the chat bot decision engine 212 can use the authentication from the matched user profile 222 to provide to the chat bot during a conversation. In some instances, once the chat bot decision engine 212 determines the match exists, the chat bot decision engine 212 can authenticate the user corresponding to the client device 164. Then, the chat bot decision engine 212 can obtain and provide one or more credentials from the user's profile 222 to the determined chat bot from the plurality of chat bots. In particular, the chat bot decision engine 212 can retrieve and provide a chat bot specific credential from a user profile 222. In some instances, once the user has been authenticated, the chat bot decision engine 212 can generate a chat bot specific credential to provide a determined credential.

In some implementations, upon matching to a particular user profile, the chat bot decision engine 212 may determine that an alert exists on or associated with the user's profile corresponding to the particular client device. For example, the alert can be a fraud alert, a withdrawal alert, a deposit alert, or any other type of alert. The chat bot decision engine 212 can provide this alert immediately to the client device before analyzing the content of the received input. In other instances, the chat bot can determine that an alert exists on the user profile. In other instances, the alert can determined after analyzing the content of the received input.

Additionally, the chat bot decision engine 212 can use the output provided by the intent deciphering module 210 to determine which chat bot to provide the received input for an answer. As described in the example above, if the message string is "FINANCE," then the chat bot decision engine 212 can determine to provide the received input to chat bot 3 in chat bot library 220 because the chat bot decision engine 212 knows that chat bot 3 corresponds to "FINANCE DATA." In another example, if the output code from the intent deciphering module is "1111", then chat bot decision engine 212 can determine from the domain intelligence 218 that the code "1111" corresponds to chat bot 2, which has a subject matter expertise in "SOCIAL MEDIA." In another example, the chat bot decision engine 212 can route the message to a chat bot without using the context of the message as a way to pass the message. In other words, the chat bot can determine a context of the message and perform the specified function requested for by the message. As a result, the chat bot decision engine 212 can determine to route the received conversational input 204 to the chat bot 2 (3).

In some instances, each chat bot can control or be controlled by a set of rules and regulations associated with its corresponding line of business (LOB) or purpose. The chat bots can ask for additional information (e.g., an additional layer of authentication), or can refuse a connection if connection and authentication requirements are not met. For example, if a user does not have or is not registered for a trading account, the chat bot can inform the chat bot manager of the issue and either decline the connection or invite the user to sign up for an account. Any suitable interactions can be performed to refuse the connection in different implementations.

In some instances, the chat bot decision engine 212 can store data in the domain intelligence 218 that the conversational input 204 was routed to chat bot 2 for future purposes. Thus, if the next conversational input 204 from the client device 202 of the same user is changed to a different chat bot, other than chat bot 2, the chat bot decision engine 212 can provide the authentication corresponding to the user profile 222 for that user to the different chat bot, such as chat bot 1, without having to ask the user to re-authenticate himself or herself. This creates a seamless transition for the user such that the user can transition between conversational inputs of different subject matters and not have to re-authenticate each time the user changes the subject matter. Additionally, once the conversation with the different chat bot (i.e., chat bot 1) is complete, the chat bot decision engine 212 can return the conversation back to the chat bot 2 based on the stored data. Further, if the user changes the conversation again to a different subject matter from the first and second conversational inputs, the chat bot decision engine 212 can seamlessly switch to a new chat bot corresponding to the different subject matter, such as chat bot 4, for example, without requiring the user to re-authenticate with the new chat bot. Additionally, the chat bot decision engine 212 can return the conversation to the first determined chat bot 1 corresponding to the first conversational input 204 because each time the subject matter changes, the chat bot engine 212 stores data in the domain intelligence 218 that indicates where the conversation had switched before determining the change in chat bots. Thus, the chat bot decision engine 212 can return to any previous point in the conversation when a conversation corresponding to a particular chat bot ends. In other implementations, each time data passes from the conversational manager 206 to the domain intelligence 218 and from the domain intelligence 218 to the conversational manager 206, the conversational manager 206 stores data in the domain intelligence 218 indication for tracking the conversation. The data stored in the domain intelligence is a generated historical context for the conversational manager 206 to track an ongoing conversation between the client device and the conversational manager. The data can include each conversational input, data determined by the chat bot decision engine 212, such as intent, chat bot, and generated authentication, as well as data provided to and from the domain intelligence 218, such as to/from the chat bots, the contextual repository 224, and the user profiles 222. In some instances, the chat bot decision engine 212 stores a count for the number of times the user provides a conversational input that results in the same intent over a predetermined period of time, such as a year. After the predetermined period of time, the chat bot decision engine 212 can compare the count to a predetermined threshold. If the count exceeds the predetermined threshold, the chat bot decision engine 212 pre-generates a response to provide to the client device for a subsequent request the automatically links the client device with a particular chat bot that corresponds with the analyzed context. This may speed up the next time the user provides the request for the analyzed context.

The NLP engine 208 (e.g., the chat bot decision engine 212) provides its output to the determined chat bot in the chat bot library 220. In some instances, the NLP engine 208 provides the output to a determined chat bot using a particular communication protocol. For example, when the NLP engine 208 provides the output to chat bot 1, the NLP engine 208 uses a first communication protocol. And when the NLP engine 208 provides the output to chat bot 2, the NLP engine 208 uses a second communication protocol. The first communication protocol is different from the second communication protocol. For example, the communication protocols can be TCP, UDP, HTTP, POP, or FTP, to name a few examples. As illustrated in FIG. 2, in response to the intent deciphering module 210 determining the subject matter of the conversational input 204 corresponds to "FINANCE DATA," since the conversational input 204 recited "How much money do I have in my bank account?", the chat bot decision engine determines that the subject matter of "FINANCE DATA" corresponds to chat bot 3. Chat bot 3's subject matter expertise is "FINANCE." Chat bot 3 can analyze and process the received request of the conversational input and determine a response. In some instances, in response to the chat bot receiving the received request from the chat bot decision engine 212, the chat bot can perform its own authentication of the user profile (4). The desired chat bot can perform the same or a different authentication as the chat bot decision engine 212, as previously mentioned.

In some instances, the chat bot first determines a more specific intent of the message than the intent determined by the intent deciphering module 210. For example, the chat bot can determine the specific intent to be "Finance: Inquiry Bank Account." Then, for the corresponding example, the chat bot 3 can determine the amount of money in the user's bank account. The chat bot 3 can use the authentication data provided by the chat bot decision engine 212 to retrieve bank account data from the user profile 222 corresponding to the authentication data. For example, the chat bot 3 can determine that the user has $2000 in his or her checking account and $10,000 in his or her savings account. In some instances, the chat bot 3 can use the authentication data received from the chat bot decision engine 212 to authenticate the user who provided the conversational input 204.

In some instances, the request provided by the user may be vague and ambiguous and cause the chat bot to determine an exact answer. In these situations, the chat bot can provide a request to the NLG engine 226 requesting for clarification from the user. For example, if the user asks in his conversational input 204 "How much money do I have in my checking account?" and the chat bot 3 determines that the user does not have a checking account but only has a savings account, the chat bot 3 may provide a request to the NLP engine 208 that requests if the user meant his/her savings account instead. Alternatively, help interactions may be provided by the chat bot and can be provided to the user via the conversational manager 206.

In some instances, the chat bot 3 provides the retrieved data based on the intent of the received input to the NLG engine 226 to provide for response (5). In particular, continuing with this example, the chat bot 3 provides the retrieved bank account information for the user who provided the conversational input 204 to the syntax and semantic generation module 228 to generate the response. For example, the bank account information includes an indication that the user has $2000 in his or her checking account and $10,000 in his or her savings account. The syntax and semantic generation module 228 identifies a base set of words, phrases, or other combinations to be used in representing the response content to the user. In particular, and as illustrated in FIG. 2, the syntax and semantic generation module 228 retrieves base words from the contextual repository 224 to initiate the generation of the response (6). For example, for providing a response to how much money the user has in his or her bank account, the syntax and semantic generation module 228 may retrieve one or more base words and synonyms from the contextual repository 224 that include the following phrase "Hi _____, you have _____ in your account." The words retrieved from the contextual repository 224 are non-specific nouns and other words that can be used to apply to each chat bot's output.

In some instances, the syntax and semantic generation module 228 can provide the generated phrase, the retrieved bank account information, and the conversational input to the chat bot filter module 230 to apply the final edits to the response before providing to the user (7). In particular, the final edits applied by the chat bot filter module 230 can be applied based on the specific chat bot, such as chat bot 3. The chat bot filter module 230 can determine from the generated phrase and the conversational input which chat bot provided the response. Next, the chat bot filter module 230 can communicate with the determined chat bot to determine a subject matter of the chat bot (8). For example, the chat bot filter module 230 can send a request to chat bot 3 to determine its subject matter expertise is "FINANCIAL." By determining the subject matter expertise of the chat bot, the chat bot filter module 230 can determine the content of the final edits to apply to the response. In particular, the chat bot filter module 230 can apply the phrases and words, along with corresponding synonyms, and the retrieved bank account information to the generated phrase based on the determined subject matter expertise of the chat bot. For example, the chat bot filter module 230 can apply the final edits to the response such that the response now recites "Hi John, I have retrieved your bank account information from your checking and savings accounts. You have $2,000 remaining in your checking account and $10,000 remaining in your savings account" (9). The chat bot filter module 230 can override some portions of the response generated by the syntax and semantic generation module 228 and also add new portions to the response generated by the syntax and semantic generation module 228. In some instances, the chat bot filter module 230 edits the generated phrase based on the determined content of the phrase, the subject matter expertise of the chat bot, the retrieved bank account information corresponding to the user profile 222, the base words retrieved from the contextual repository, and base words/synonyms corresponding to the particular chat bot. Once the new conversational response 232 has been generated, the NLG engine 226 provides the new conversational response 232 to the client device 202 for display to the user (10).

In some instances, if the conversational analysis system 102 determines that a channel medium connecting to the client device cannot receive the response, then conversational analysis system 102 determines a different response. A channel medium can be a communication pathway between the client device 164 and the conversational analysis system 102. For example, the channel medium can be a wireless communication or a wired communication over a network 182. Additionally, a type of the channel medium can be text, video, or voice. The conversational analysis system 102 determines the user can only transmit and receive audio recordings, the conversational analysis system 102 can provide an audio recording of the generated response to the client device 164. In other instances, the conversational analysis system 102 can provide the generated response to another client device, different from client device 164, corresponding to the user profile 156.

In some instances, once the new conversational response 232 is provided to the client device 202, the user can provide a response back to the NLP engine 208. The response can be related to the conversational response 232 or non-related. For example, the user's new conversational input 204 can include a message reciting "Great thanks. Can you please transfer $1000 dollars from my savings account to my checking account?" The intent deciphering module 210 and the chat bot decision engine 212 can determine collectively that this conversation relates to the previous conversation. In particular, the intent deciphering module 210 can determine the intent of this conversation. In response, the chat bot decision engine 212 can compare the determined intent of the new conversational input 204 to the stored indication describing the intent and the determined chat bot from the last conversation. For example, the last conversation's intent was determined to be "FINANCE," and the corresponding chat bot was determined to be chat bot 3. Considering the new conversational input 204's intent corresponds to "FINANCE," the chat bot decision engine 212 can provide the new conversational input 204 to the chat bot 3 to continue the conversation from the previous conversational input. However, if the intent deciphering module 210 determines the intent of the new conversational input 204 corresponds to "SOCIAL MEDIA," the chat bot decision engine 212 then determines that the intent of the new conversational input 204 is not the same as the previous conversational input 204. Thus, the chat bot decision engine 212 determines the chat bot that corresponds to the intent of "SOCIAL MEDIA" corresponds to chat bot 2. The chat bot decision engine 212 compares the intent of "SOCIAL MEDIA" and the selection of chat bot 2 to the stored indication from the previous conversation to determine the old conversational input 204 has a different intent than the new conversational input 204. Thus, the chat bot decision engine 212 provides the new conversational input 204 to chat bot 2 and stores a new indication in memory that the new conversational input 204 corresponds to "SOCIAL MEDIA" and a selection of chat bot 2. Additionally, the chat bot decision engine 212 provides the authentication data corresponding to the chat bot 2. In typical systems, the user would need to re-authenticate himself or herself each time a new chat bot is requested. However, in this system, the chat bot decision engine 212 can provide the authentication data corresponding to the user to the new chat bot without having the user re-authenticate. This provides seamless switching between chat bots during ongoing conversation with a particular user, without having the user ever notice a change in the chat bot usage.

Figure 3:
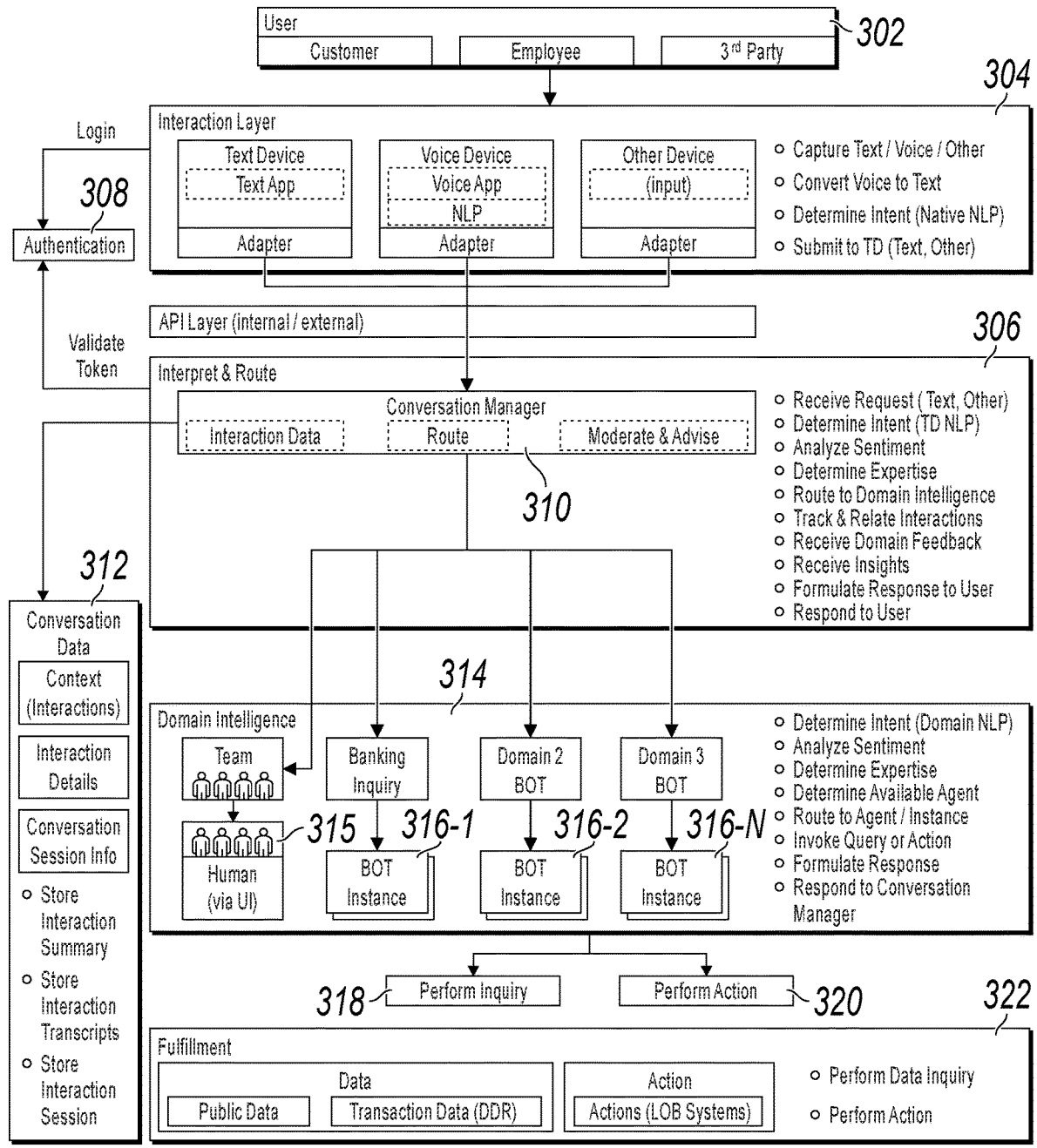
FIG. 3 is an alternative block diagram illustrating a general example system providing a chat bot management system that facilitates conversations between a device and various chat bots.

FIG. 3 is an alternative block diagram illustrating a general example system 300 providing a chat bot management system that facilitates conversations between a user and various chat bots. The system 300 is similar and has similar components to system 200 and system 100. In particular, system 300 has users 302 that can communicate with client devices to request for data from the domain intelligence 314. For example, users 302 can include a customer, an employee, or a third party individual or application. The users can communicate with an interaction layer 304 of the example system 300. The interaction layer 304 can include one or more devices, such as a texting device, a voice device, or another device. In some instances, the texting device and the voice device can be in the same device. For example, the device can be a mobile device or a personal computer. The device can be used to provide the request and determine an intent of the request. In some instances, the device can determine the intent of the request. In other instances, the intent of the request is determined at the conversation manager 310.

In some instances, the request can be provided to the interpret and route layer 306. In order for the request to be accepted by the conversation manager 310, the user logins to the interpret and route layer 306 using an authentication 308 method. For example, the user provides his or her username and password to authenticate into the interpret and route layer 306. The interpret and route layer 306 compares the username and password with a stored token corresponding to the user profile, and if a match exists, authenticates the user access to the interpret and route layer 306.

The interpret and route layer 306 includes a conversation manager 310. The conversation manager 310 can be one or more servers. The conversation manager 310 seeks to interact with data provided by the interaction layer 304, route data provided from the interaction layer 304 to the domain intelligence layer 314, and moderate and advise the current and subsequent data between the interaction layer 304 and the domain intelligence layer 314. In particular, the conversation manager 310 receives the request from the interaction layer 304 in the form of text, voice, or another form and determine an intent of the request. The conversation manager 310 determines an intent of the request using natural language processing (NLP). In response to determining the intent of the NLP, the conversation manager analyzes the request and its corresponding intent to determine an expertise of the intended request. For example, if the intent of the request is for "SOCIAL MEDIA," the conversation manager 310 can determine the expertise is for a chat bot in the social media realm. In particular, the conversation manager 310 can determine that the request should be routed to chat bot 3 because chat bot 3's expertise is social media.

The conversation manager 310 routes the request to one or more places in the domain intelligence 314. For example, the domain intelligence 314 includes a team of individuals, a banking inquiry, a Domain 2 BOT, or a Domain 3 BOT. The conversation manager 310 also stores an indication of the received request as well as the routed chat agent in conversation data 312. The conversation data 312 includes context (interactions), interaction details, and conversation session info. In some instances, the conversation manager stores the indication in the conversation data 312 each time data passes from the conversation manager 310 to the domain intelligence 314 and when data passes from the domain intelligence 314 to the interpret and conversation manager 310. In some instances, the domain intelligence 314 includes a corresponding agent for each routed actor. For example, the team portion of the domain intelligence 314 includes one or human actor 315 that can communicate with a user 302 through the conversation manager 310. In another example, the banking inquiry, the domain 2 BOT, and the domain 3 BOT, each correspond to BOT instance 316-1, 316-2, and 316-N, respectively.

Each of the humans 315 or bot instances 316-1 through 316-N can either perform an inquiry 318 or an action 320 based on the received request. In some instances, the humans 315 or the bot instances may perform both an inquiry and an action. For example, if the user requests for bank account information, the bot 316-1 may perform an inquiry 318. In another example, if the user requests for the conversation manager 310 to move money between a checking account and a savings account, the bot 316-1 may perform an action 320. In another example, if the user requests for buying 10 shares of a stock if the price is below $20 per share, the bot 316-1 may perform an inquiry 318 to determine a stock price and may perform an action 320 to buy 10 shares of the stock, as illustrated in fulfillment 322. Once the bot instance 316-1 performs the inquiry 318 and/or the action 320, the bot instance 316-1 returns the data to the conversation manager 310. As mentioned earlier, the conversation manager 310 stores an indication in the conversation data 312 that describes the results returned by the bot instance 316-1. Additionally, the conversation manager 310 provides the results, in a formulated manner, to the user 302 based on his or her request.

FIG. 4 is an example screenshot from one implementation of an example of an interface 400 for a chat bot management system as displayed on a client device for providing interactions with two or more chat bots. The interface 400 illustrates a conversation 402 displayed on a client device (e.g., client device 164) for the user to interact with one or more chat bots through a conversation manager. For instance, in message 404, a user sends a text to the conversation manager that recites "Hey, how are my TFSA stocks doing today?" The conversation manager interprets the received request for processing. As shown in message 406, the conversation manager responds with "Hi Melissa! Welcome back ☺ I am happy to get that info for you." The conversation manager recognizes Melissa as a returning customer, and formulates a response to Melissa, as shown in the message 406. In addition, the conversation manager determines intent from the message 404 and routes the request to a bot for stock data. In some instances, the bot determines a specific intent of the message. For example, the bot interprets the specific intent of the message to be "Summary: investments." In response to the bot determining the intent of the message, the bot retrieves information from the customer account for the TFSA stock. Based on the information retrieved from the customer account, the bot formulates a response in the form of a graph/chat and sends the formulated response to the conversation manager. In other implementations, the bot sends the data to the conversation manager and the conversation manager formulates the data in the form of a graph/chart. Additionally, the conversation manager can reformulate the data to match channel capabilities. For example, if the link between the user's client device and the conversation manager has low bandwidth, and the formulated graph/chart is a large file, the conversation manager can reduce the quality of the formulated graph/chart to speed up the transmission of the graph/chart. In another example, if the conversation manager determines that the user is communicating with a voice-only channel, such as Alexa or Google Home, for example, the conversation manager can determine an alternative method to deliver the data from the formulated graph/chart. For example, the conversation can determine the alternative method of delivery to be audio data and can read the text off the formulated graph/chart. Alternatively or additionally, the conversation manager can determine that the user account also has a corresponding mobile device different from the device connected to the conversation manager, and route the formulated graph/chart to the different mobile device corresponding to the user account.

Next, the user can send a message 410 to the conversation manager that recites "Pls transfer $2,500 from my Checking's to that account." The conversation manager recognizes from the message 410 that the "that account" portion of the message 410 refers to the TFSA stock account from the previous message 404. In particular, the conversation message's stored indication from the previous message 404 indicates that "that account" refers to the account in the previous message 404. Thus, the conversation manager determines an intent of the message 410 and using the stored context from the previous message, forwarding the message to the previous bot with the same context. In some instances, the conversation manager can forward the message to a different chat bot, if the different chat bot has similar expertise. In some instances, the chat bot that received the request from the conversation manager interprets a specific intent of the message. For example, the specific intent of the message 410 can be "Transaction: Account Transfer." The chat bot can then retrieve the banking data corresponding to the user profile from the received request. In some instances, the bot can seek clarification on a request from the user. For example, the bot can determine that request was vague in which type of checking account the user requests to transfer money from and provide this indication to the conversation manager. The conversation manager can provide this in a request for clarification to the user. As shown in FIG. 4, the conversation formulates a response that recites "I can certainly do that for you. I see you have two checking accounts, which one would you like me to transfer from? Ultimate Checking Account: $13,420.33 Minimum Checking Account: $6,552.41." The user responds with message 414 that recites "Ultimate." The conversation manager receives the message 414 and determines that the response is a follow-up request from the chat bot. The conversation manager routes the request to the particular chat bot that requested the clarification. The chat bot receives the request from the conversation manager and determines the specific intent of the request to be "Transaction: Account Transfer." The chat bot executes the request by transferring $2,500 from the Ultimate Checking Account: $13,420.33 to the TFSA stock account. The bot then provides a confirmation to the conversation manager that the request has been fulfilled. The conversation manager can formulate a response to confirm to the user that the transaction has been completed. In particular, the response is shown in message 416 reciting "Great. I've transferred $2,500 from your Ultimate Checking Account to your CAD TFSA."

The user can then transmit a message 418 that recites "Buy 10 shares of ABC Stock." The conversation manager and an identified bot can perform the request identified by message 418 using steps similar to the steps performed during 404 through 416. In response, the conversation manager can provide a message 420 to the user reciting "To confirm, you would like to buy 10 shares of ABC Stock at $41.53 CAD each, for a total of $415.30 CAD within your CAD TFSA account. You will be charged an additional $9.99 for this purchase. Would you like to proceed?" As illustrated in FIG. 4, the user responds with "Yes" as shown in message 422. The user can press the button "Yes," speak "Yes," or type "Yes" on his or her client device to confirm.

Figure 5:
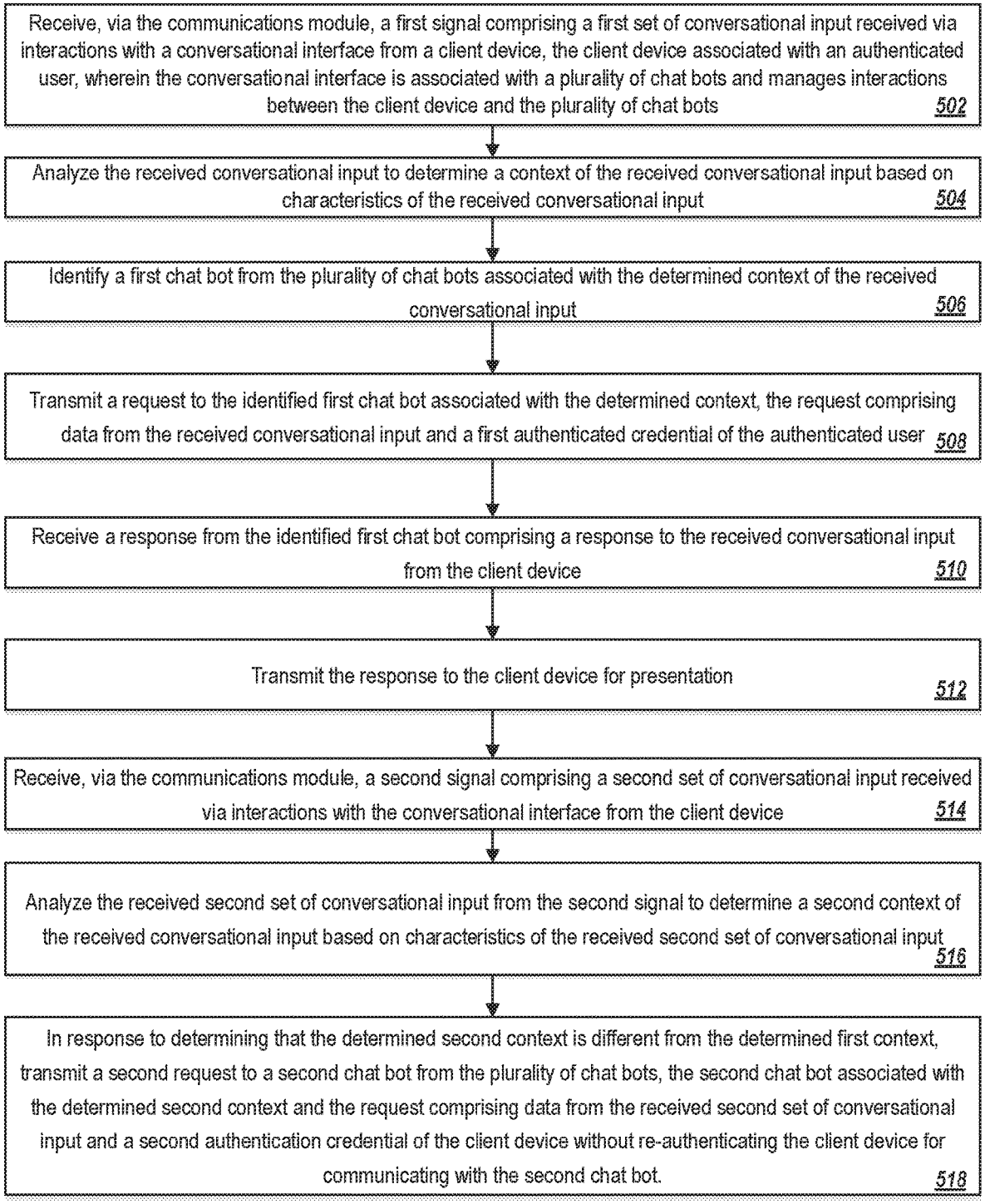
FIG. 5 is a flowchart of an example method performed at a chat bot management server in connection with a client device for facilitating conversations between a user at the client device and various chat bots.

FIG. 5 is a flowchart of an example method 500 performed at a chat bot management server in connection with a client device for facilitating conversations between a user at the client device and various chat bots. It will be understood that method 500 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 500. In some implementations, the method 500 and related methods are executed by one or more components of the system 100 described above with respect to FIG. 1, or the components described in FIGS. 2 and 3.

At 502, a first signal including a first set of conversational input is received via interactions with a conversational interface from a client device, the client device associated with an authenticated user, wherein the conversational interface is associated with a plurality of chat bots and manages interactions between the client device and the plurality of chat bots. In some instances, the first signal can include only the content of the conversational input, while in other instances the first signal may also include an identification of a particular user or user profile associated with the conversational input. In some instances, the conversational input may be received at a specific endpoint associated with a particular conversational interface or related application, such that the analysis of the conversational input is based on the use of the particular conversational interface or related application. Examples may include a digital assistant or a particular website, where the conversational input is to be responded to based on the information obtainable by or related to that particular interface or application.

In some instances, the conversational input may be or may include text-based input, auditory input (e.g., an audio file), and/or video or image input. The conversational input can be submitted by a user or agent associated with a particular user profile, although for purposes of some implementations of method 500, identification of the particular user profile is not needed to perform the personalization process. In some instances, the received conversational input can represent a particular query, question, or interactive communication.

At 504, the received conversational input is analyzed to determine a context of the received conversational input based on characteristics of the received conversational input. The context associated with the received input can be determined via a natural language processing engine or service to determine a meaning of the request. The intent may be used to determine a particular response to be generated. An intent deciphering module 210 can be used by the natural language processing engine to determine a meaning or intent of the received request. In particular, the output can be a message string describing the intent of the received input or a code that corresponds to a particular intent used by each of the chat bots. For example, the message string can be "FINANCE" or "SOCIAL MEDIA," which can then be used by the chat bot decision engine 212. In another example, the intent deciphering module 210 can output a code such as "1101" that corresponds to a particular intent, such as "MORTGAGE." In some instances, the intent deciphering module 210 can determine a type of the conversational input 204 as well, such as a question, a statement, or a request, to name a few examples.

At 506, a first chat bot is identified from the plurality of chat bots associated with the determined context of the received conversational input. In particular, a chat bot decision engine 212 in the natural language processing engine can determine using the intent provided in step 504 a chat bot to route a request including the received message to during the conversation. For example, the chat bot decision engine 212 can use the output provided by the intent deciphering module 210 to determine which chat bot to provide the received input for an answer. As described in the example above, if the message string is "FINANCE," then the chat bot decision engine 212 can determine to provide the received input to chat bot 3 in chat bot library 220 because the chat bot decision engine 212 knows that chat bot 3 corresponds to "FINANCE DATA." In another example, if the output code from the intent deciphering module is "1111", then chat bot decision engine 212 can determine from the domain intelligence 218 that the code "1111" corresponds to chat bot 2, which has a subject matter expertise in "SOCIAL MEDIA." As a result, the chat bot decision engine 212 can determine to route the received conversational input 204 to the chat bot 2.

At 508, a request is transmitted to the identified first chat bot associated with the determine context, the request including data from the received conversational input and a first authenticated credential of the authenticated user. The chat bot, such as chat bot 3, for example, identified by the chat bot decision engine 212 can receive the request from the chat bot decision engine 212. In some instances, the chat bot first determines a more specific intent of the message than the intent determined by the intent deciphering module 210. For example, the chat bot can determine the specific intent to be "Finance: Inquiry Bank Account." Then, for the corresponding example, the chat bot 3 can determine the amount of money in the user's bank account. The chat bot 3 can use the authentication data provided by the chat bot decision engine 212 to retrieve bank account data from the user profile 222 corresponding to the authentication data. For example, the chat bot 3 can determine that the user has $2000 in his or her checking account and $10,000 in his or her savings account. In some instances, the chat bot 3 can use the authentication data received from the chat bot decision engine 212 to authenticate the use who provided the conversational input 204.

At 510, a response is received from the identified first chat bot including a response to the received conversational input from the client device. In particular, as continued with the example from above, the chat bot 3 provides the retrieved data based on the intent of the received input to the NLG engine 226 to provide for response. In particular, continuing with this example, the chat bot 3 provides the retrieved bank account information for the user who provided the conversational input 204 to the syntax and semantic generation module 228 to generate the response. For example, the bank account information includes an indication that the user has $2000 in his or her checking account and $10,000 in his or her savings account. The syntax and semantic generation module 228 identifies a base set of words, phrases, or other combinations to be used in representing the response content to the user. In particular, and as illustrated in FIG. 2, the syntax and semantic generation module 228 retrieves base words from the contextual repository 224 to initiate the generation of the response. In some instances, the syntax and semantic generation module 228 can provide the generated phrase, the retrieved bank account information, and the conversational input to the chat bot filter module 230 to apply the final edits to the response before providing to the user. In particular, the final edits applied by the chat bot filter module 230 can be applied based on the specific chat bot, such as chat bot 3. The chat bot filter module 230 can determine from the generated phrase and the conversational input which chat bot provided the response. Next, the chat bot filter module 230 can communicate with the determined chat bot to determine a subject matter of the chat bot. For example, the chat bot filter module 230 can send a request to chat bot 3 to determine its subject matter expertise is "FINANCIAL." By determining the subject matter expertise of the chat bot filter module 230 can determine the content of the final edits to apply to the response. For example, the chat bot filter module 230 can apply the final edits to the response such that the response now recites "Hi John, I have retrieved your bank account information from your checking and savings accounts. You have $2,000 remaining in your checking account and $10,000 remaining in your savings account." The chat bot filter module 230 can override some portions of the response generated by the syntax and semantic generation module 228 and also add new portions to the response generated by the syntax and semantic generation module 228. In some instances, the chat bot filter module 230 edits the generated phrase based on the determined content of the phrase, the subject matter expertise of the chat bot, the retrieved bank account information corresponding to the user profile 222, the base words retrieved from the contextual repository, and base words/synonyms corresponding to the particular chat bot.

At 512, the response is transmitted to the client device for presentation. In particular, once the new conversational response 232 has been generated, the NLG engine 226 provides the new conversational response 232 to the client device 202 for display to the user over the network. In some instances, if the conversational analysis system 102 determines that a channel medium connecting to the client device cannot receive the response, then conversational analysis system 102 determines a different response. For example, the conversational analysis system 102 determines the user can only transmit and receive audio recordings, the conversational analysis system 102 can provide an audio recording of the generated response to the client device 164. In other instances, the conversational analysis system 102 can provide the generated response to another client device, different from client device 164, corresponding to the user profile 156.

At 514, a second signal is received including a second set of conversational input received via interactions with the conversational interface from the second client device. The second signal is similar to the first signal, in that it includes only the content of the conversational input, while in other instances the second signal may also include an identification of a particular user or user profile associated with the conversational input. However, the second signal's content is different from the first signal's content. Additionally, the conversational input of the second signal may be or may include text-based input, auditory input (e.g., an audio file), and/or video or image input.

At 516, the received second set of conversational input from the second signal is analyzed to determine a second context of the received conversational input based on characteristics of the received conversational input. 516 is similar to 504, in that the second context of the received conversational input is analyzed via a natural language processing engine or service to determine a meaning of the request. The intent may be used to determine a particular response. In particular, the intent deciphering module 210 can be used by the natural language processing engine to determine a meaning or intent of the received request. The output can be a message string describing the intent of the received input or a code that corresponds to a particular intent used by each of the chat bots.

At 518, in response to determining that the determined second context is different from the determined first context, transmit a second request to a second chat bot from the plurality of chat bots, the second chat bot associated with the determined second context and the request including data from the received second set of conversational input and a second authentication credential of the client device without re-authentication the client device for communicating with the second chat bot. In particular, the user can provide a second response to the NLP, and the NLP determines the new second request's intent is different from the first request's intent, the chat bot decision engine 212 determines a new chat bot corresponding to the new second request, and transmits the new second request to the new chat bot. For example, if the intent deciphering module 210 determines the intent of the new conversational input 204 (e.g., the second request) corresponds to "SOCIAL MEDIA," the chat bot decision engine 212 then determines that the intent of the new conversational input 204 is not the same as the previous conversational input 204 (e.g., the first request). Thus, the chat bot decision engine 212 determines the chat bot that corresponds to the intent of "SOCIAL MEDIA" corresponds to chat bot 2. The chat bot decision engine 212 compares the intent of "SOCIAL MEDIA" and the selection of chat bot 2 to the stored indication from the previous conversation to determine the old conversational input 204 has a different intent than the new conversational input 204. Thus, the chat bot decision engine 212 provides the new conversational input 204 to chat bot 2 and stores a new indication in memory that the new conversational input 204 corresponds to "SOCIAL MEDIA" and a selection of chat bot 2. Additionally, the chat bot decision engine 212 provides the authentication data corresponding to the chat bot 2.

The preceding figures and accompanying description illustrate example processes and computer-implementable techniques. But system 100 (or its software or other components) contemplates using, implementing, or executing any suitable technique for performing these and other tasks.

It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
    a communications module;
    at least one memory storing instructions and a plurality of chat bots, and a repository of contextual content, the contextual content for use in formulating at least one response generated in response to a conversational contextual input; and
    at least one hardware processor interoperably coupled with the at least one memory and the communications module, wherein the instructions instruct the at least one hardware processor to:
        receive, via the communications module, a first set of conversational input received via interactions with a conversational interface from a client device associated with an authenticated user, wherein the conversational interface is associated with the plurality of chat bots and manages interactions between the client device and the plurality of chat bots;
        determine a first context of the received first set of conversational input;
        transmit, via the communication module, a request to a first chat bot associated with the determined first context, the request comprising data from the received conversational input and a first authenticated credential of the authenticated user;
        receive, via the communication module, a response from the first chat bot comprising a response to the received conversational input from the client device;
        receive, via the communications module, a second set of conversational input received via interactions with the conversational interface from the client device;
        determine a second context of the received second set of conversational input; and
        in response to determining that the determined second context is different from the determined first context, transmit, via the communications module, a second request to a second chat bot from the plurality of chat bots different than the first chat bot, the second chat bot associated with the determined second context, the second request comprising data from the received second set of conversational input and a second authentication credential of the client device and wherein the second request is transmitted to the second chat bot without re-authenticating the client device to the second chat bot.

2. The system of claim 1, wherein:
    determining the first context of the received first set of conversational input comprises determining the first context of the received first set of conversational input based on characteristics of the received first set of conversational input;
    determining the second context of the received second set of conversational input comprises determining the second context of the received second set of conversational input based on characteristics of the received second set of conversational input; and
    wherein the instructions further instruct the at least one hardware processor to:
        prior to transmitting the request to the first chat bot associated with the determined first context, identifying the first chat bot from the plurality of chat bots as associated with the determined first context; and
        after receiving the response from the identified first chat bot comprising the response to the received conversational input from client device, transmitting, via the communication module, the response to the client device for presentation.

3. The system of claim 2, the instructions further instructing the at least one hardware processor to:
    in response to determining an authentication of a user corresponding to the client device, comparing credentials of the user to one or more stored credentials; and
    generating the authentication credential for the user corresponding to the client device in response to determining the credentials of the user matches one or more stored credentials.

4. The system of claim 2, wherein determining the first context is different from the second context comprises:
    generating a historical context for the client device to track an ongoing conversation that comprises the first set of conversational input, the second set of conversational input, and one or more subsequent sets of conversational input from the client device stored in memory;
    storing the first context in the memory; and
    storing the second context in the memory.

5. The system of claim 4, wherein generating the historical context for the client device to track an ongoing conversation that comprises the first set of conversational input, the second set of conversational input, and one or more subsequent sets of conversational input from the client device in stored memory further comprises:
    receiving a second response from the second chat bot comprising a second response to the second set of conversational input from the client device;
    transmitting the second response from the second chat bot to the client device for presentation;
    in response to determining a conversation with the second chat bot has ended, transmitting a third request to the identified first bot indicating a return to the received conversational input with the client device; and
    transmitting a response to the third request to the client device indicating the return to the received conversational input.

6. The system of claim 2, wherein transmitting the response to the client device further comprises:
    generating a graphical representation of the response from the identified first chat bot; and
    transmitting the graphical representation of the response from the identified first chat bot to a conversational manager to provide to the client device.

7. The system of claim 1, wherein determining the first context of the received first set of conversational input further comprises:
- generating a count for a number of times the client device transmits a conversational input for the determined context over a period of time;
- comparing the count to a predetermined threshold; and
- in response to determining the count exceeds the predetermined threshold, generating a response to provide to the client device for a subsequent request that links the client device with a particular chat bot that corresponds to the determined context.

8. The system of claim 1, wherein the received first set of conversational input comprises a received query.

9. The system of claim 1, wherein the received first set of conversational input comprises textual input received via the conversational interface or audio input received via the conversational interface.

10. The system of claim 1, wherein transmitting the request to the first chat bot further comprises generating the request using a first protocol that the first chat bot recognizes.

11. The system of claim 10, wherein transmitting the request to the second chat bot from the plurality of chat bots further comprises generating the request using a second protocol, different from the first protocol that the second chat bot recognizes.

12. The system of claim 1, wherein the first authentication credential is utilized for communicating with the first chat bot and the second authentication credential is utilized for communicating with the second chat bot.

13. The system of claim 1, wherein each of the plurality of chat bots is associated with a particular subject, product, or type of request, and wherein determining a context of a received set of conversational input comprises identifying one of a particular subject product, or type of request associated with the received set of conversational input.

14. The system of claim 13, wherein identifying a chat bot from the plurality of chat bots associated with a determined context comprises matching the identified one of a particular subject, product, or type of request associated with the received set of conversational input with a corresponding chat bot from the plurality of chat bots associated with the particular subject, product, or type of request.

15. The system of claim 1, wherein transmitting the second request to the second chat bot without re-authenticating the client device to the second chat bot comprises providing, based on prior authentication of the user associated with the client device, the second authentication credential of the client device without requiring additional user input related to authentication prior to transmitting the second request.

16. A non-transitory, computer-readable medium storing computer-readable instructions executable by a computer and configured to:
- receive, via a communications module, a first set of conversational input received via interactions with a conversational interface from a client device associated with an authenticated user, wherein the conversational interface is associated with a plurality of chat bots and manages interactions between the client device and the plurality of chat bots;
- determine a first context of the received first set of conversational input;
- transmit, via the communication module, a request to a first chat bot from the plurality of chat bots associated with the determined first context, the request comprising data from the received conversational input and a first authenticated credential of the authenticated user;
- receive, via the communication module, a response from the first chat bot comprising a response to the received conversational input from the client device;
- receive, via the communications module, a second set of conversational input received via interactions with the conversational interface from the client device;
- determine a second context of the received second set of conversational input; and
- in response to determining that the determined second context is different from the determined first context, transmit, via the communications module, a second request to a second chat bot from the plurality of chat bots different than the first chat bot, the second chat bot associated with the determined second context, the second request comprising data from the received second set of conversational input and a second authentication credential of the client device and wherein the second request is transmitted to the second chat bot without re-authenticating the client device to the second chat bot.

17. The computer-readable medium of claim 16, wherein:
- determining the first context of the received first set of conversational input comprises determining the first context of the received first set of conversational input based on characteristics of the received first set of conversational input;
- determining the second context of the received second set of conversational input comprises determining the second context of the received second set of conversational input based on characteristics of the received second set of conversational input; and
- the instructions further configured to:
  - prior to transmitting the request to the first chat bot associated with the determined first context, identifying the first chat bot from the plurality of chat bots as associated with the determined first context; and
  - after receiving the response from the identified first chat bot comprising the response to the received conversational input from client device, transmitting, via the communication module, the response to the client device for presentation.

18. The computer-readable medium of claim 16, wherein each of the plurality of chat bots is associated with a particular subject, product, or type of request, and wherein determining a context of a received set of conversational input comprises identifying one of a particular subject product, or type of request associated with the received set of conversational input, and wherein identifying a chat bot from the plurality of chat bots associated with a determined context comprises matching the identified one of a particular subject, product, or type of request associated with the received set of conversational input with a corresponding chat bot from the plurality of chat bots associated with the particular subject, product, or type of request.

19. The computer-readable medium of claim 16, wherein transmitting the second request to the second chat bot without re-authenticating the client device to the second chat bot comprises providing, based on prior authentication of the user associated with the client device, the second authentication credential of the client device without requiring additional user input related to authentication prior to transmitting the second request.

20. A computerized method performed by one or more processors, the method comprising:
- receiving, via a communications module, a first set of conversational input received via interactions with a conversational interface from a client device associated with an authenticated user, wherein the conversational interface is associated with a plurality of chat bots and manages interactions between the client device and the plurality of chat bots;
- determining a first context of the received first set of conversational input;
- transmitting, via the communication module, a request to a first chat bot from the plurality of chat bots associated with the determined first context, the request comprising data from the received conversational input and a first authenticated credential of the authenticated user;
- receiving, via the communication module, a response from the first chat bot comprising a response to the received conversational input from the client device;
- receiving, via the communications module, a second set of conversational input received via interactions with the conversational interface from the client device;
- determining a second context of the received second set of conversational input; and
- in response to determining that the determined second context is different from the determined first context, transmitting, via the communications module, a second request to a second chat bot from the plurality of chat bots different than the first chat bot, the second chat bot associated with the determined second context, the second request comprising data from the received second set of conversational input and a second authentication credential of the client device and wherein the second request is transmitted to the second chat bot without re-authenticating the client device to the second chat bot.

* * * * *